(12) United States Patent
Park

(10) Patent No.: US 8,723,372 B2
(45) Date of Patent: May 13, 2014

(54) SYSTEM FOR INDUCING A HIGH EFFICIENCY CONDUCTIVE STATE IN MATERIALS

(76) Inventor: Larry A. Park, Manning, OR (US)

( * ) Notice: Subject to any disclaimer, the term of this patent is extended or adjusted under 35 U.S.C. 154(b) by 540 days.

(21) Appl. No.: 13/192,060

(22) Filed: Jul. 27, 2011

(65) Prior Publication Data

US 2012/0098354 A1     Apr. 26, 2012

Related U.S. Application Data

(60) Provisional application No. 61/405,053, filed on Oct. 20, 2010.

(51) Int. Cl.
  *H05K 7/14*     (2006.01)
(52) U.S. Cl.
  USPC ........... 307/149; 307/129; 307/134; 307/138; 307/139; 340/5.82; 361/225
(58) Field of Classification Search
  USPC ................... 307/149, 129, 134–139, 99–101; 340/5.82; 361/225
  See application file for complete search history.

(56) References Cited

U.S. PATENT DOCUMENTS

| 1,282,708 | A | * | 10/1918 | Oppenheim | .................. | 110/215 |
|---|---|---|---|---|---|---|
| 3,292,021 | A | | 12/1966 | Hoag | | |
| 5,280,240 | A | | 1/1994 | Shaulov et al. | | |
| 5,339,062 | A | | 8/1994 | Donaldson et al. | | |
| 5,379,020 | A | | 1/1995 | Meier et al. | | |
| 5,665,662 | A | | 9/1997 | Eibl | | |
| 7,122,828 | B2 | | 10/2006 | Bao et al. | | |
| 7,932,783 | B2 | | 4/2011 | Park | | |
| 8,067,985 | B2 | | 11/2011 | Park | | |

| 2010/0053789 | A1 | | 3/2010 | Duric et al. | | |
|---|---|---|---|---|---|---|
| 2010/0068512 | A1 | | 3/2010 | Imaoka et al. | | |
| 2011/0175703 | A1 | * | 7/2011 | Benkley, III | .................. | 340/5.82 |

OTHER PUBLICATIONS

International Search Report and Written Opinion, mailed Jan. 31, 2012, in PCT International Patent App. No. PCT/US11/54970, Larry A. Park, 13 pgs.

(Continued)

*Primary Examiner* — Rexford Barnie
*Assistant Examiner* — Jagdeep Dhillon
(74) *Attorney, Agent, or Firm* — Chernoff Vilhauer McClung & Stenzel, LLP

(57) ABSTRACT

A method of inducing a high efficiency conductive state at room temperature within a conductive mass (1) by injecting a complex modulated carrier signal (7) into one or more injection points (2,3) whereby the carrier signal and the subharmonic modulation frequencies (4,5,6) which are imbedded in the modulation of the carrier signal are tuned to the mass lattice qualities of the material. The amplitude and phase relationship of each individual subharmonic frequencies (4,5,6) are respectively tuned to the mass lattice qualities of the conductive mass (1). This method of excitation, with precise matching of subharmonic modulation frequencies, and with a precise matching concordant harmonic of the carrier frequency, creates an observed ionic excitation throughout the conductive mass (1) at room temperature. Also disclosed are novel methods of injection into a conductive mass using multiple injection locations in a conductive mass with excitation fields including electrical current induction, electrostatic induction, magnetic induction, and photonic stimulation. This novel excitation of mass has a number of beneficial applications including induction of faster switching operation of silicon semiconductor devices at lower operating power levels, improving battery performance whereby loss of electrode resistance is observed within the battery, improving motor performance by loss elimination within the windings of the motor, and improving power transmission by eliminating losses in the conductors.

32 Claims, 9 Drawing Sheets

Phase shift

(56) References Cited

OTHER PUBLICATIONS

Gabovich et al., "Competition of Superconductivity and Charge Density Waves in Cuprates: Recent Evidence and Interpretation," Hindawi Publishing Corporation, Advances in Condensed Matter Physics, vol. 2010, Article ID 681070, 40 pgs.
Gabovich et al., "Charge-density-wave origin of the dip-hump structure in tunnel spectra of the BSCCO superconductor," Physical Review B, vol. 75, No. 6, Article IDS 064516, 2007, 1 pg. (Abstract).
Ekino et al., "Temperature-dependent pseudogap-like features in tunnel spectra of high-Tc cuprates as a manifestation of charge-density waves," Journal of Physics: Condensed Matter, vol. 20, No. 42, Article ID 425218, 2008, 1 pg. (Abstract).
Gabovich et al., "Superconductors with charge- and spin-density waves: theory and experiment," Fizika Nizkikh Temperatur, vol. 26, No. 5, 2000, 1 pg. (Abstract).
Gabovich et al., "Charge- and spin-density-wave superconductors," Superconductor Science and Technology, vol. 14, No. 4, 2001, 1 pg. (Abstract).
Bischofs et al., "Polaron and bipolaron defects in a charge density wave: a model for ightly doped BaBiO3," Physical Review B, vol. 65, No. 11, Article ID 115112, 2002, 1 pg. (Abstract).
Merz et al., "X-ray absorption of Ba1-xKxBiO3 and BaPb1-yBiyO3: competition between bipolaronic and charge-density wave states," Europhysics Letters, vol. 72, No. 2, 2005, 1 pg. (Abstract).
Pashitskii et al., "The role of the charge density fluctuations and many-body Coulomb correlations in the mechanism of high-temperature superconductivity in cuprate metal-oxides," Fizika Nizkikh Temperatur, vol. 27, No. 2, 2001 pp. 140-152 with English translation of Abstract.
Reznik et al., "Electron-phonon coupling reflecting dynamic charge inhomogeneity in copper oxide superconductors," Nature, vol. 44, No. 7088, 2006, 1 pg. (Abstract).
Wise et al., "Charge density-wave origin of cuprate checkerboard visualized by scanning tunneling microscopy," Nature Physics, vol. 4, No. 9, 2008, 5 pgs.
Karppinen et al., "Control of the charge inhomogeneity and high-Tc superconducting properties in homologous series of multi-layered copper oxides," Materials Science and Engineering R., vol. 26, No. 3, 1999, 1 pg. (Abstract).
Gabovich et al., "Charge and spin-density waves in existing superconductors: competition between Cooper pairing and Peierls or excitonic instabilities," Physics Reports, vol. 367, No. 6, 2002, 1 pg. (Abstract).
Koike et al., "Inhomogeneous superconductivity in both underdoped and overdoped regimes of high-Tc cuprates," Journal of Physics: Conference Series, vol. 108, Nol. 1, Article ID 012003, 2008, 9 pgs.
Fan, "Predictions of highest Transition-temperature for electron-phonon superconductors," Physica C, vol. 469, No. 4, 2009, 13 pgs.
Alexandrov, "High temperature superconductivity due to a long-range electron-phonon interaction, application to isotope effects, thermomagnetic transport and nanoscale heterogeneity in cuprates," Journal of Superconductivity, vol. 18, No. 5-6, 2005, 22 pgs.
Kadin, "Coherent Lattice Vibrations in Superconductors," Physica C, vol. 468, No. 4, 2008, 15 pgs.

\* cited by examiner

Phase shift

SYSTEM FOR INDUCING A HIGH EFFICIENCY CONDUCTIVE STATE IN MATERIALS

CROSS-REFERENCE TO RELATED APPLICATIONS

This application claims the benefit of U.S. Provisional App. No. 61/405,053, filed Oct. 20, 2010.

BACKGROUND OF THE INVENTION

This invention relates generally to a method of inducing and maintaining a high efficiency conductive state in a conductive mass, and more particularly, maintaining a high efficiency conductive state in common conductive metals, including semi-conductive elements, above or below room temperature.

High-temperature superconducting materials, such as Bi—Sr—Ca—Cu—O, found in U.S. Pat. No. 5,665,662, transition to a superconducting state at temperatures near 90K to 105K. This transition temperature, or Tc, requires coolant to keep the material below the transition temperature (Tc) to maintain the desired conductive state. The manufacture of these higher transition (Tc) temperature superconductors are complex—such as bismuth-strontium-calcium-copper oxide, or yttrium-barium-copper oxide, and include a careful sintering process in maintaining a specific desired chemical composition. The resulting material is also limited in ductility, compared to common metals, as there are parametric limits to the brittleness of the final chemical composition.

The foregoing and other objectives, features, and advantages of the invention will be more readily understood upon consideration of the following detailed description of the invention, taken in conjunction with the accompanying drawings.

SUMMARY OF THE INVENTION

The present invention involves a method of injecting a precisely tuned signal into a common conductive metal, such as aluminum, to create an exited ionic state within the entire mass, resulting in the mass exhibiting similar characteristics of a sustained homogeneous charge density wave (CDW). An electrical signal generator is used to produce the complex and precisely tuned and phase matched wave form frequencies which are applied to, and match the mass lattice tuning, of the target mass. Various locations of injection of the stimulation signal include a single point of injection (FIG. 4) or multiple locations of injection (FIG. 3) both of which depends on the symmetry or complexity of the target mass geometry. In addition to direct wire connect, a non-bonded physical pressure based conductive point wire injection method may be employed. Other forms of injection of the stimulation signal include electrostatic field induction (FIG. 5), magnetic field induction (FIG. 7), and photonic induction (FIG. 6) with a modulated light beam (such as a LASER). Upon achieving a mass lattice excitation state in a target mass through this special tuned stimulation method, the high efficiency conductive state has been observed to be transmittable to other metals or semiconductors by simple physical contact. Suitable physical contact, from the target mass to another metal or semiconductor material, has been found through bonding using a dielectric based epoxy (52) as shown in FIG. 16, by welding (69) as shown in FIG. 20, by conductive electrical epoxy bonding compounds (53c) as shown in FIG. 17, or by silicon die (65) in FIG. 19.

DETAILED DESCRIPTION OF PREFERRED EMBODIMENT

Using a programmable waveform generator, with waveform generating characteristics that include amplitude modulation of a tunable carrier frequency with one or more tunable subharmonic modulation frequencies, and which includes a tunable phase relationship to the carrier and to each individual subharmonic modulation frequencies, a mass lattice excitation state in a common metal conductor may be found. This mass lattice excitation state is also achievable in semiconductor materials with the afore-described programmable waveform generator. The preferred temperatures of this excitation state is greater than −10 degrees C., preferably greater than 0 degrees C., and more preferably greater than 25 degrees C. In this preferred excitation state, the resistance of the material is decreased, and preferably substantially decreased toward zero resistance.

This mass lattice excitation state, of a target mass, has been observed to produce special conductive states in metal conductors and in semiconductors. The degree of the change (lowering) in conductivity within conductors, from this induced special excitation method, is proportional to the degree of the intensity of the mass lattice excitation. In addition, semiconductor devices have been observed to increase in switching speed while lowering their operating switching bias, lowering operating switching thresholds, lowering their operating current, lowering resistance, and lowering noise levels all in proportion to the degree of the intensity of the induced mass lattice excitation from a target mass.

While the exact effect induced within a stimulated target mass is not fully understood, the present inventor theorizes that a coherent atomic resonance is developing within the target mass that results in broad phonon excitation throughout the mass. This coherent phonon effect forms a transmittal mechanism within and through dielectric elements, conductive elements, or semiconductor elements, that are in physical contact to the target mass, resulting in a transfer of a sympathetic coherent resonance into the atomic structure of these nearby elements. Since the atomic excitation transfers to other differing elements, the broad phonon excitation is believed to contain a wide spectrum of phonon frequencies such that this spectrum provides a matched tuning of the appropriate phonons, facilitating absorption, into the atomic structure of the conductive and semiconductor elements—even if differing in the isotope element of the excited target mass.

Employing a harmonic relationship between the carrier and subharmonic modulation of the carrier, using a range of carrier frequencies (from 100 Hz to 50,000 Hz), including greater frequencies for radio frequency simulations, and then empirically testing in finding a set of suitable subharmonics to modulate the carrier frequency, an optimal mass lattice excitation state may be determined for a metal conductor or for a semiconductor material.

Figure 8:
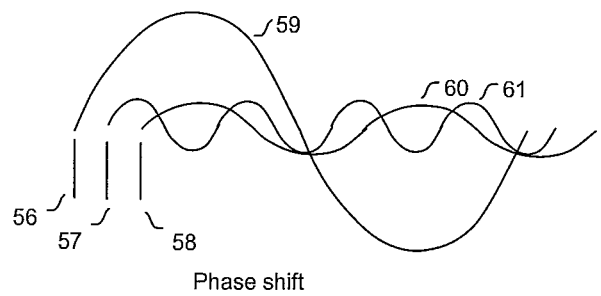
FIG. 8 is a drawing illustrating relative phase shifting of multiple subharmonic signals that are part of the desired signal parameter tuning in the modulation of the complex carrier wave to a given target mass.
Figure 9:
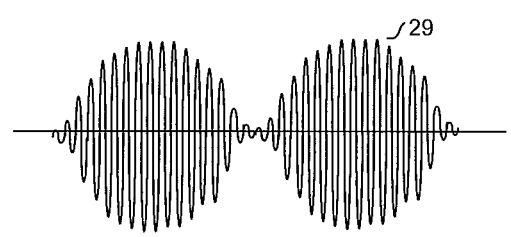
FIG. 9 is a drawing illustrating a single sine-wave modulated subharmonic on a higher frequency carrier sine wave.
Figure 18:
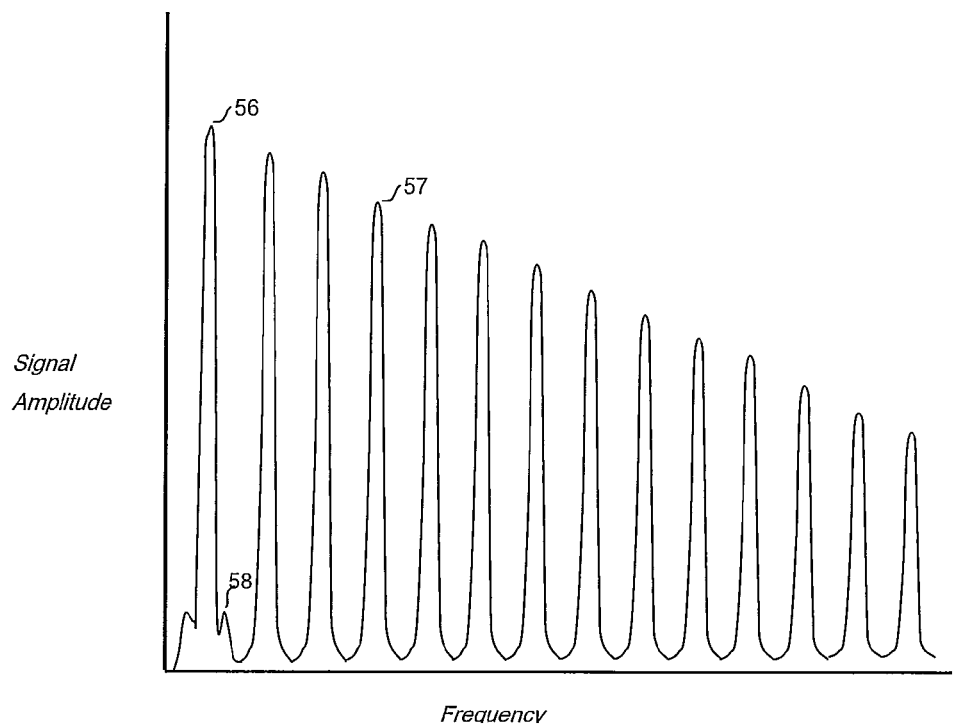
FIG. 18 is an illustration of a series of harmonic peak frequencies shown in a Fast Fourier Transform (FFT) plot, from a Dynamic Signal Analyzer, whereby the target mass responds to in a tuned state during signal injection testing.

Secondary (5) and tertiary (6) subharmonics are generally found within 100 hz above or below the primary subharmonic (4). Finding the primary subharmonic includes an empirical tuning process where the carrier (56) develops a slow observable undulation (58), on the skirts of the FFT plot as shown in FIG. 18. During this tuning process, a harmonic series of frequencies (57) will increase in amplitude when approaching the optimal mass lattice excitation for a particular target mass. Further tuning of the secondary and tertiary subharmonic optimization involves adjusting the phase relationship between the primary subharmonic (4), the secondary subharmonic (5), and the tertiary subharmonic (6). An example phase relationship (56, 57, 58) of the subharmonic frequencies (59, 60, 61) are shown in FIG. 8.

Typically, the slow undulation (58) is preferably at a frequency of less than 1,000 hertz, and more preferably at a frequency of less than 500 hertz. The carrier FFT amplitude (56) preferably likewise has an amplitude that is substantially larger than the corresponding harmonic FFT amplitudes (57). The harmonic FFT amplitudes (57) are preferably 25% or less of the amplitude of the carrier FFT amplitude (56), and more preferably 10% or less of the amplitude of the carrier FFT amplitude (56). Preferably there are several harmonics, such as 4 or more, more preferably 5 or more, and more preferably 10 or more, each of which has the preferable FFT amplitudes.

Another characterization of approaching or otherwise reaching an appropriate state are transient changes in the FFT amplitude(s) that occur occasionally, generally in the frequency range of the slow undulation (58), having an amplitude of preferably greater than 10% of the carrier FFT amplitude (56), and more preferably greater than 20% of the carrier FFT amplitude (56). The duration of the transient is preferably less than 1000 milliseconds, more preferably less than 750 milliseconds, and more preferably less than 500 milliseconds.

Excitation injection current is generally below 500 milli-amperes and above 10 micro-amperes, with two or more physical injection wires, depending on the desired strength of the excitation state within the target mass. Since the material is typically conductive, and would typically result in a "short" between the conductors, however when reaching the appropriate state the carrier and the harmonics are created.

When the system is suitably tuned to the appropriate state, a transition may occur where the carrier FFT (56) increases substantially in amplitude and the slow undulation (58) tends to substantially decrease or is otherwise no longer readily observable. Also, when the system is suitably tuned to the appropriate state, an increase in the number of harmonics (57) having generally the same amplitude will occur, such as double the number of such harmonics.

Empirical testing has found that the optimal relationship of the carrier to the primary subharmonic frequency generally follows a binary weighted relationship with the carrier frequency with a multiplier of $2^n$ where n=1 to 6 (2×, 4×, 8×, 16×, 32×, 64×). A general even harmonic relationship should be maintained if the carrier frequency is above 64× of the modulated primary subharmonic frequency. Odd harmonic frequency relationships of the carrier to the primary subharmonic frequency have been observed to be less stable than an even harmonic ratio.

Figure 10:
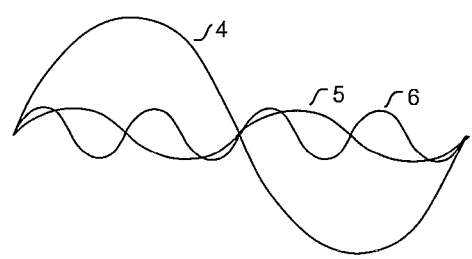
FIG. 10 is a drawing illustrating multiple subharmonic signals that are part of the desired signal modulation of the complex carrier wave to a given target mass.
Figure 11:
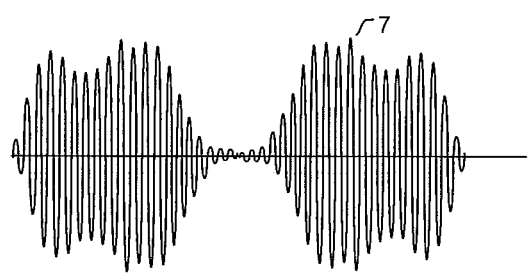
FIG. 11 is a drawing of the multiple subharmonic signals of FIG. 10 incorporated into a complex carrier wave.

FIG. 10 illustrates three subharmonic frequencies of a primary frequency (4), a 2× upper harmonic to the primary subharmonic frequency (5), and a 4× harmonic frequency to the primary subharmonic frequency (6). Modulation of these three subharmonic frequencies (4, 5, 6), using an upper harmonic carrier, is illustrated in FIG. 11. The resulting modulated carrier signal (7) is injected into the target mass.

Figure 12:
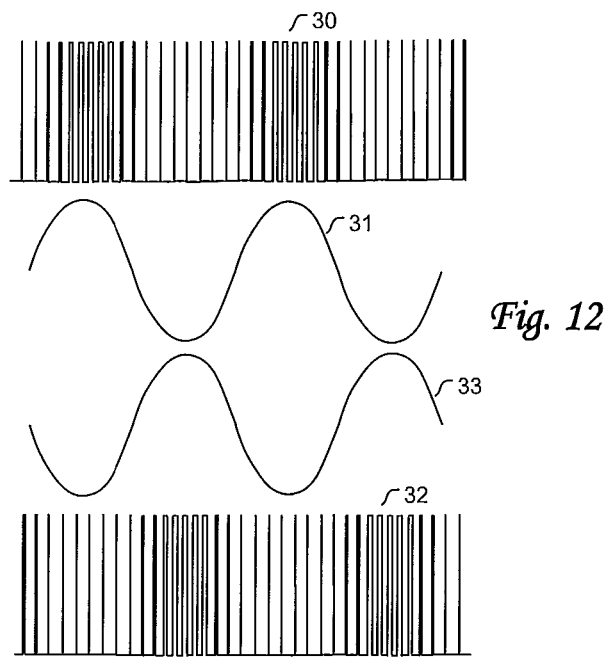
FIG. 12 is a drawing illustrating an alternate form of a complex carrier wave with subharmonic injection using a digital form of pulse width modulation (PWM) to induce the desired subharmonic signals while injecting a given target mass.

Another suitable method of a subharmonic carrier modulated stimulation, shown in FIG. 12, is achievable in a digital signaling method through pulse width modulation (PWM). A subharmonic base frequency (31) may be encoded into a carrier based PWM digital signal (30). A second shifted subharmonic signal (33), encoded on a carrier using PWM (32) allows phase shift injection. The illustration shows a 180 degree phase shift between one injection carrier signal (30), PWM subharmonic modulated (31), and a second injection carrier signal (32), PWM subharmonic modulated (33). This digital PWM method provides the ability to encode multiple subharmonic frequencies, using PWM power modulation, on a base carrier frequency.

Figure 4:
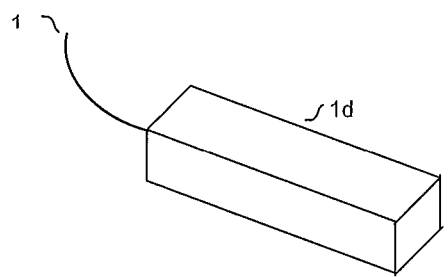
FIG. 4 is an illustration of a single injection point at a corner of a symmetrical metal conductor and target mass.

Mass lattice excitation, in its simplest form, shown in FIG. 4, is achieved using a single subharmonic frequency modulated carrier (29) injected into a target mass (1d) with a single injection wire (16). An example embodiment of a target mass (1d) is a rectangular 6061 aluminum mass with polished smooth surfaces with dimensions of 0.125 inches square by 0.500 inches in length. The injection wire (16) of 0.010 inch diameter 14K gold wire is weld bonded to the target mass (1d) at the corner with the welded wire exit angle aligned to the apex of the corner tip of the target mass.

Figure 1:
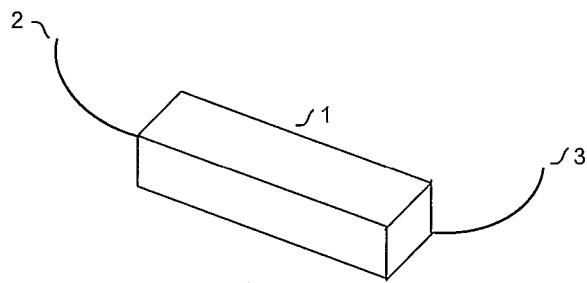
FIG. 1 is an illustration of symmetrical injection points at opposite corners of a symmetrical metal conductor and target mass.
Figure 2:
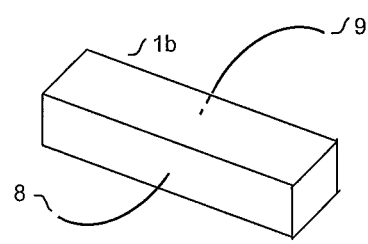
FIG. 2 is an illustration of symmetrical injection points at the center of and opposing sides of a symmetrical metal conductor and target mass.

Improved performance of excitation of the target mass (1), shown in FIG. 1, is realized with two injection wires (2, 3) at symmetrically opposite corners of the target mass (1). An alternative embodiment of paired injection wires (8, 9) is illustrated in FIG. 2 with two symmetrically located injection points at the center of opposite faces in the target mass (1b).

Figure 3:
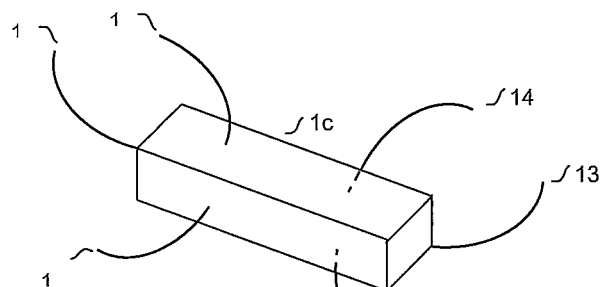
FIG. 3 is an illustration of symmetrical injection points at the corners and at offset symmetrical and opposing sides of a symmetrical metal conductor and target mass.

A third embodiment, in FIG. 3, includes six injection wires bonded at symmetrically balanced locations on one half of the target mass (1c) using three injection wires (10, 11, 12) and three injection wires (13, 14, 15) on the other half of the target mass. When injection locations are shifted with respect to each other, as in the case of three or six injection wires (10, 11, 12, 13, 14, 15), phase shifting of the injected modulated carrier and the subharmonic frequencies are required to properly develop the mass lattice excitation. FIG. 8 illustrates phase shift (56, 57, 58) of a set of subharmonic frequencies (59, 60, 61). Additional injection locations, such as illustrated, provides a method of increasing the Q of the mass lattice excitation effect to compensate for materials whereby the element isotope purity of the target mass is generally less than 90% pure.

Figure 7:
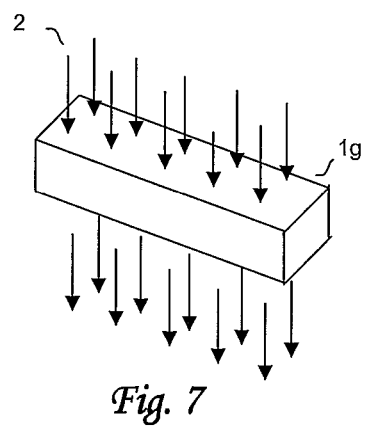
FIG. 7 is an illustration of a metal conductor and target mass stimulated by a distributed magnetic field.

Another method of mass lattice excitation, shown in FIG. 7, is employed using target mass materials having magnetic permeability properties, whereby the magnetic flux (27) is stimulated using a subharmonic modulated carrier frequency. The magnetic flux acts as the injection source to the target mass (1g). The injection method uses a wide surface area of the target mass. In this application, the target mass material is not a magnet. Similarly, a wide surface area injection of the target mass may be accomplished as shown in FIG. 7 with a higher carrier frequency in the RF spectrum to achieve electromagnetic coupling.

Figure 5:
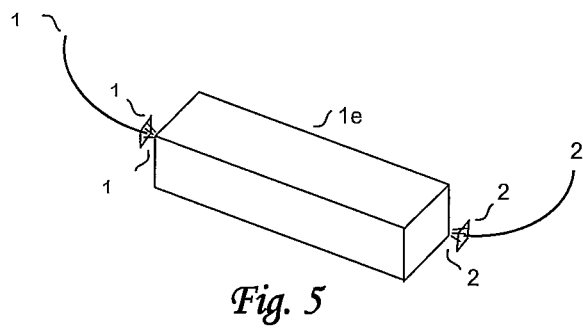
FIG. 5 is an illustration of symmetrical injection points using electrostatic field stimulation at opposite corners of a symmetrical metal conductor and target mass.

Injection of the target mass may be alternately accomplished using electrostatic fields through plates (18, 21) as shown in FIG. 5. The electrostatic fields (19, 20) develop near the corner points of the target mass (1e) forming injection points. This method has the advantage of creating a loosely coupled method of stimulation as the injection wires (17, 22) are not directly bonded to the mass. This method provides another advantage of electrical isolation from the target mass material.

Figure 6:
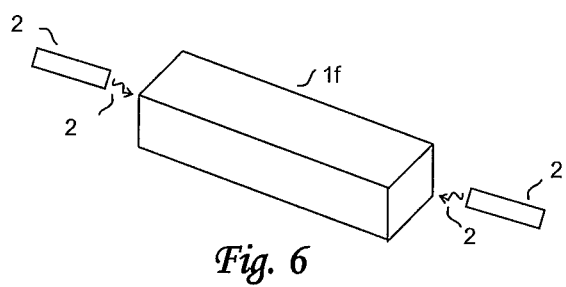
FIG. 6 is an illustration of symmetrical injection points using a LASER to stimulate at opposite corners of a symmetrical metal conductor and target mass.

FIG. 6 illustrates another method of isolated stimulation of a target mass (1f) using a focused modulated light beam (24, 25) with photon based light sources (23, 26) such as a LASER using a tuned carrier modulated signal.

Figure 13:
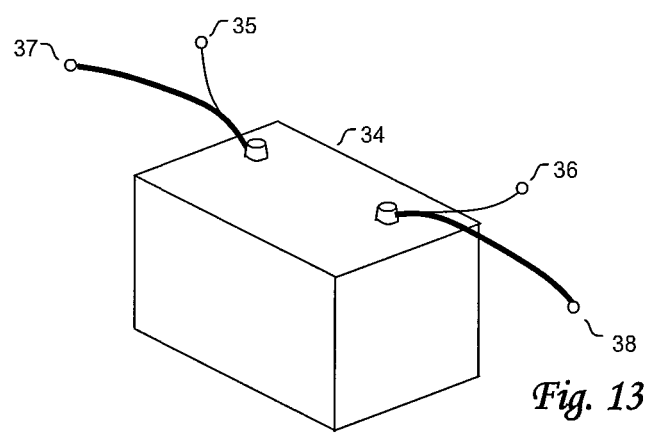
FIG. 13 is an illustration of a lead-acid battery where the terminals of the battery are used as injection points and the target mass is the internal plates of the battery.
Figure 14:
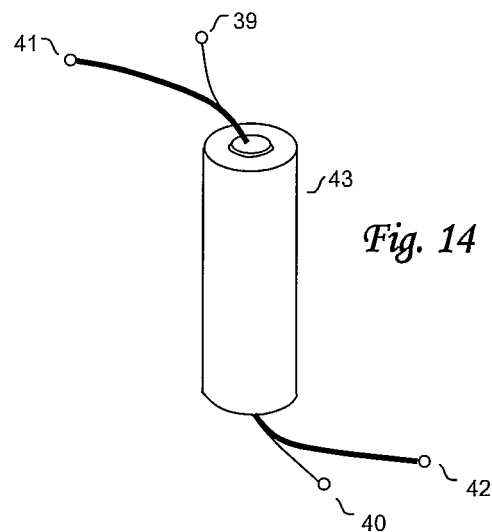
FIG. 14 is an illustration of a small battery where the terminals of the battery are used as injection points and the target mass is the internal electrode(s) of the battery.

FIG. 13 illustrates a method of injecting a tuned carrier modulated signal, through the terminals of a battery, through stimulation wires (35, 36), whereby the internal plates of the battery (34) are used as the target mass to be brought into a high efficiency conductive state. FIG. 14 alternately illustrates a method of injecting a tuned carrier modulated signal, through the terminals of a small battery (43), through stimulation wires (39, 40), whereby the internal metal plate of the battery is used as the target mass to be brought into a high efficiency conductive state.

Figure 16:
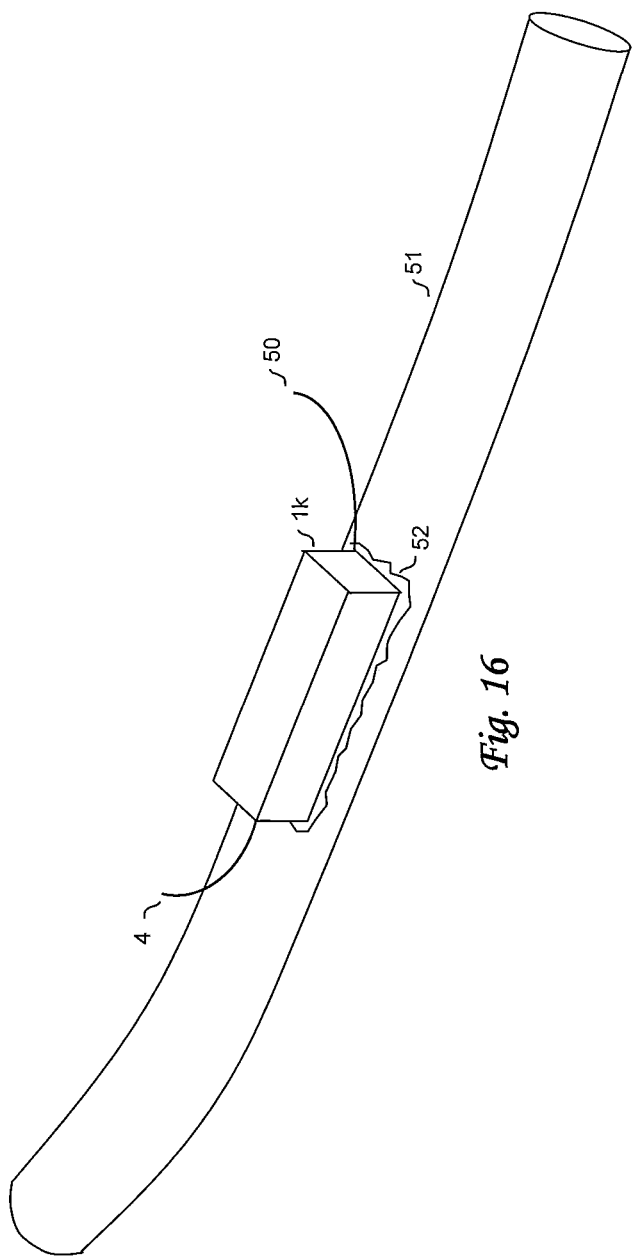
FIG. 16 is an illustration of a target mass bonded to a conductor of another type of mass whereby the target mass is used to induce an excited state into the conductor.
Figure 17:
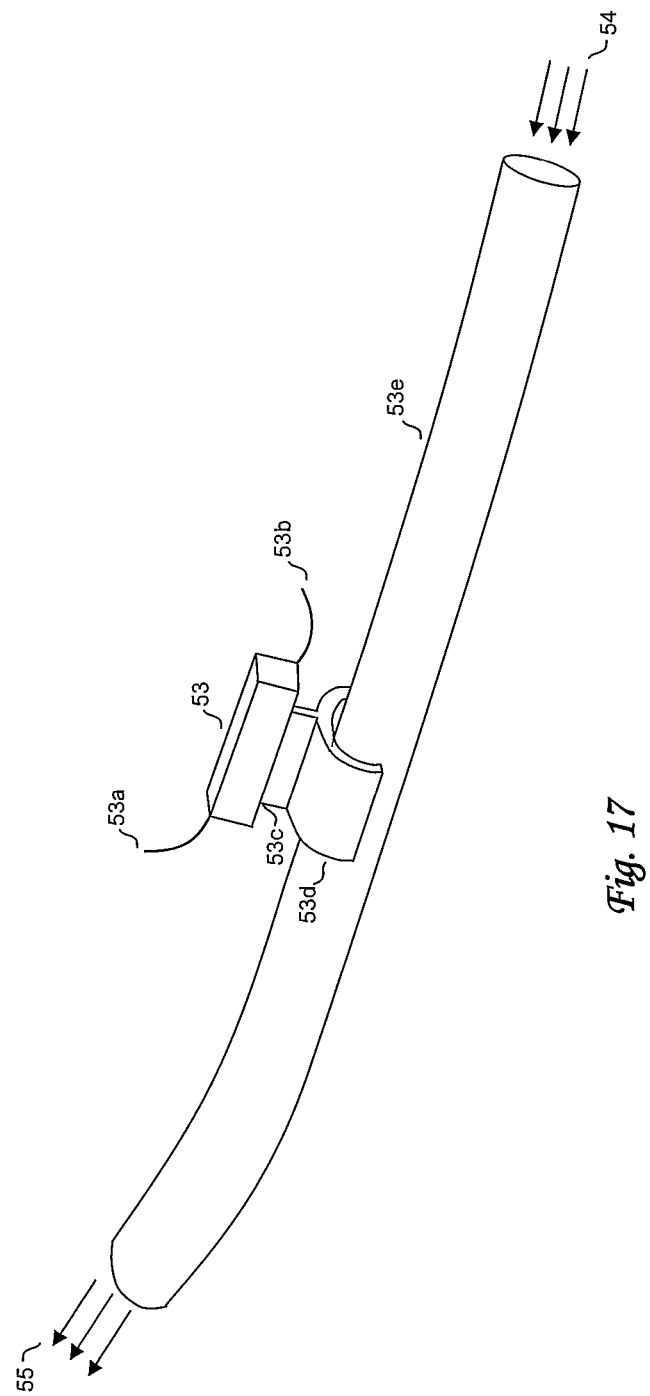
FIG. 17 is an illustration of a target mass physically clamped to a conductor whereby the target mass is used to induce an excited state into the conductor.

FIG. 16 illustrates a method of exciting a conductor (51) into a high efficiency conductive state using a target mass (1k), that is bonded by either a conductive or insulator based bonding material (52)—such as an epoxy—, and injecting a tuned carrier modulated signal through injection wires (49, 50). FIG. 17 illustrates an alternate method of exciting a conductor (53e) into a efficiency conductive state using a target mass (53) and injection wires (53a, 53b), that is physically clamped (53d) to the conductor (53e). The target mass (53) transfers its excitation state through the physical contact of the seam of the clamp blade (53c), which is bonded to the target mass by either a conductive or insulator based bonding material.

Figure 15:
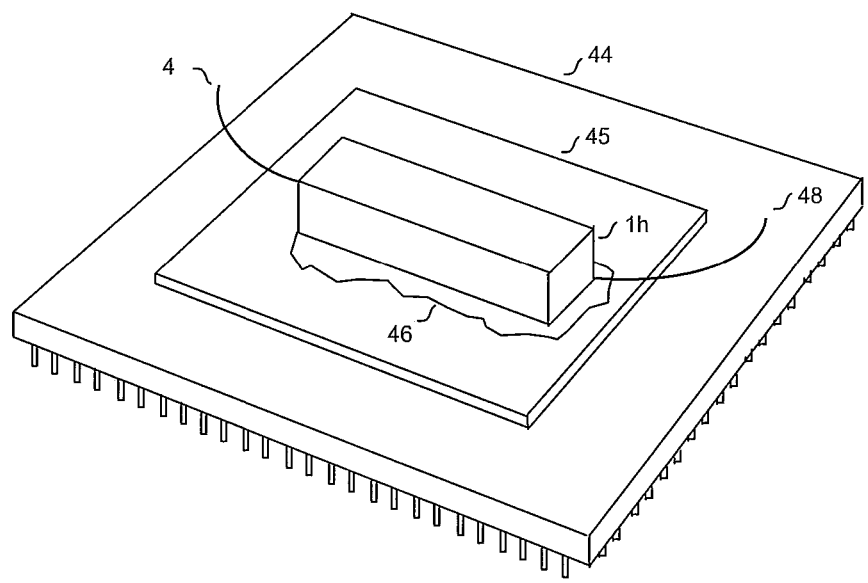
FIG. 15 is an illustration of a target mass bonded to the substrate of a computer IC where the target mass is used to induce an excited state into the substrate and transistor layers of the IC.

FIG. 15 illustrates a method of exciting a computer IC die (45) into a high efficiency conductive and semiconductor operating state using a target mass (1h), that is bonded directly to the die by either a conductive or insulator based bonding material (46), and injecting a tuned carrier modulated signal through injection wires (47, 48).

Figure 19:
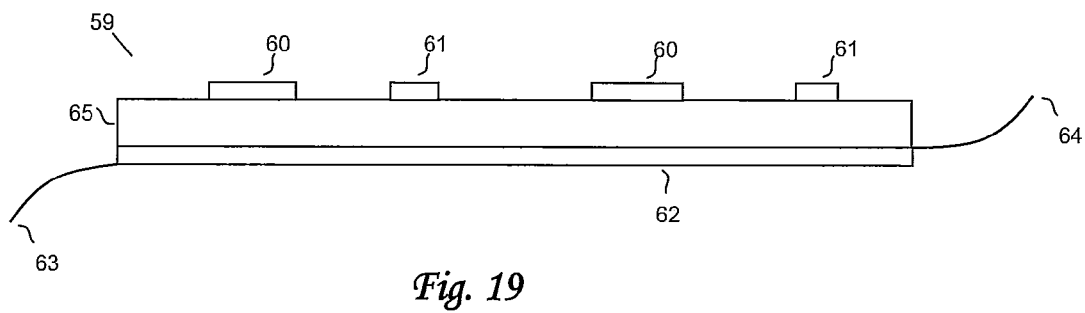
FIG. 19 is an illustration of a semiconductor device where the target mass is imbedded within the semiconductor silicon.

FIG. 19 illustrates a method of exciting a semiconductor die (59) by using a conductive metalization layer (62) as the target mass, on the substrate (65), whereby injection wires (63, 64) are used to create an excitation state from injecting a tuned carrier modulated signal. Semiconducting devices (60) and conductors (61) are sympathetically brought into an excited state through silicon layer or layers (65). The injection wires shown may be accomplished alternatively through the semiconductor device fabrication. The preferential location of the injection wires would be at symmetrical locations of the target mass geometry as demonstrated in FIG. 1, 2, or 3 for target mass examples (1), (1b), and (1c) respectively.

Figure 20:
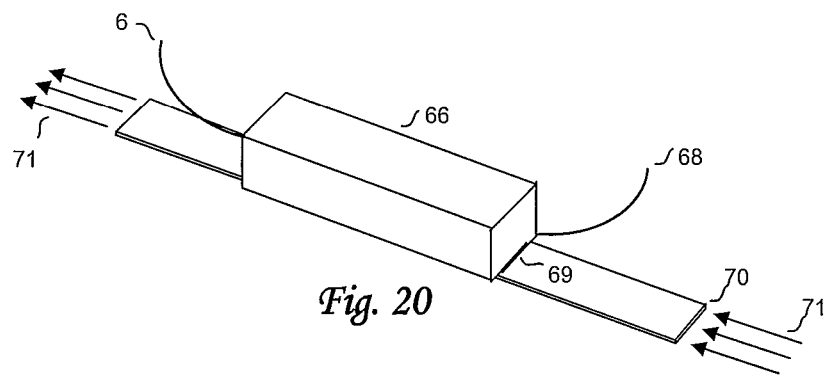
FIG. 20 is an illustration of a target mass conductively bonded to a copper conductor trace where the target mass, when excited, will induce an excited state into the current flow within the copper trace.

FIG. 20 illustrates a method of exciting a printed circuit board copper trace (70) into a high efficiency conductive state using a target mass (66), that is bonded either by a conductive or insulator based bonding material (69), and injecting a tuned carrier modulated signal through injection wires (67, 68). The high efficiency conductive state alternately has an additional benefit within conductors as this excitation will transfer within the current flow (71) into electrical components (such as semiconductor devices) connected to the copper trace. This excited current flow will then induce beneficial semiconductor operation as previously described—lower resistance, lower power, higher speed operation, lower operating switching thresholds, and lower noise levels.

Figure 21:
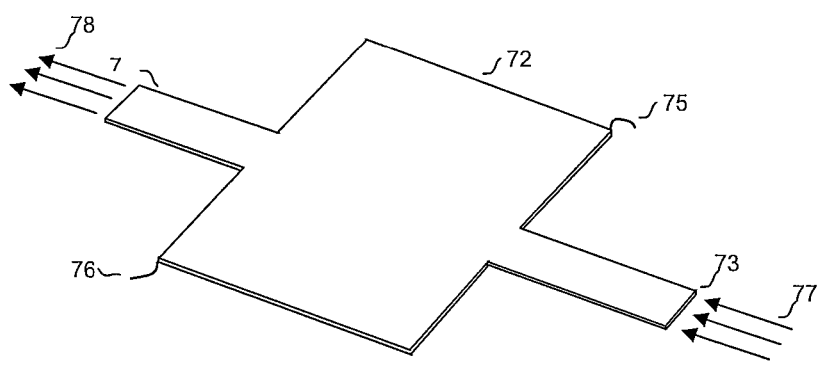
FIG. 21 is an illustration of a target mass shape formed as part of a conductor where current flow through the target mass, when the target mass shape is excited, will induce an excited state into the current flow within the conductor.

FIG. 21 illustrates a method of creating a target mass shape (72) in a conductor material where the target mass includes a conductive path (73, 74) for current flow (77, 78) to circuitry or devices. Injecting a tuned carrier modulated signal through injection wires (75, 76) results in a high efficiency conductive state within the target mass and within the current flow path (73, 74). This high efficiency conductive state excites the current flow through the target mass (77, 78). This excited current flow will then induce beneficial semiconductor operation as previously described—lower resistance, lower power, higher speed operation, lower operating switching thresholds, and lower noise levels—in circuitry or devices powered by this current flow (78).

It is to be understood that this technology may be useful for a variety of different applications. For example, for car batteries or small batteries having plates, electrodes, and electrolyte, it may be suitable to substantially increase the duration of the charge of the battery. For example, for semiconductor devices (e.g., optical, transistors, LED's, FET's, MOSFETS, etc), this technology may be used to target a mass attached to die, target a mass attached to Intermediate Heat Spreader (IHS), include a metallization layer as target mass, and have the semiconductor layer (it is a conductor) act as a target mass. For integrated circuits, the target mass may be attached to die, the target mass may be attached to Intermediate Heat Spreader (IHS), a metallization layer as a target mass, and a semiconductor layer (it is a conductor) as a target mass. For power conductors and traces on a circuit board, the target mass may be physically attached to a trace, the target mass may be created out of trace material, the target mass may be conductively bonded to the trace, and the target mass may be insulatively bonded to trace. For transmission lines and/or wires, the target mass may be physically attached to wire, the target mass may be conductively bonded to a wire, and the target mass may be insulatively bonded to a wire. For electronic motors and/or alternators, this may be used with the excitation of the windows and the excitation of the stator or rotor ferromagnetic material.

Another characteristic that may be used, in addition or alternative to a change in resistance, is an improvement in the magnetic permeability of ferromagnetic materials. It is believed that when in a suitable state as previously described, the ferro-magnetic materials have an increased ability to absorb magnetic flux. In addition when a semiconductor material with semiconductor devices fabricated therewith when in a suitable state as previously described, may likewise achieve benefits. These benefits may include, for example, the semiconductor device's operating and/or switching voltage drops and/or becomes lower, the semiconductor device switches faster with less current, the semiconductor device operates with lower power requirements, and the semiconductor device's signal to noise ratio improves.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

I claim:

1. A method for establishing a conductive state in a material comprising:
   (a) interconnecting at least one conductor interconnected with said material having a resistivity at a particular frequency of an applied signal;
   (b) a signal being provided to said material from said conductor, in a manner suitable to decrease at least one of (1) the resistivity of said material and (2) the magnetic permeability, where said signal includes a first signal together with another different signal, with a response that includes a response signal together with a series of at least four generally harmonic frequencies, wherein said at least four generally harmonic frequencies are less than 25% of the amplitude of said response signal, where characteristics of at least one of said first signal and said another different signal are tuned to selectively modify said response.

2. The method of claim 1 wherein a response of said material to said response signal includes an undulated signal associated therewith having a frequency of less than 1,000 hertz.

3. The method of claim 2 wherein said response to said material to said response signal includes said undulated signal associated therewith having a frequency of less than 500 hertz.

4. The method of claim 1 wherein said response further includes transients generally in the frequency range of said undulating signal having an amplitude change of greater than 10% of the amplitude of said response signal.

5. The method of claim 1 wherein said response further includes transients generally in the frequency range of said undulating signal having an amplitude change of greater than 20% of the amplitude change of said response signal.

6. The method of claim 4 wherein said transients is less than 750 milliseconds in duration.

7. The method of claim 4 wherein said transients is less than 500 milliseconds in duration.

8. The method of claim 1 wherein said material is a metal material.

9. The method of claim 1 wherein said material is a semiconductor material.

10. The method of claim 1 wherein said material is a ferromagnetic material.

11. The method of claim 1 wherein said material is an elongate conductor.

12. The method of claim 1 wherein said material is generally square.

13. The method of claim 1 wherein said material is generally rectangular.

14. The method of claim 1 wherein said material is generally cylindrical.

15. The method of claim 1 wherein said material is generally irregular.

16. The method of claim 1 wherein said at least one conductor is physically bonded to said material.

17. The method of claim 1 wherein said at least one conductor is in non-contact communication.

18. The method of claim 1 wherein said at least one conductor is in face to face abutment.

19. The method of claim 1 wherein said signal is electrical.

20. The method of claim 1 wherein said signal is electrostatic.

21. The method of claim 1 wherein said signal is magnetic.

22. The method of claim 1 wherein said signal is photonic.

23. The method of claim 1 wherein said signal is electromagnetic.

24. The method of claim 1 further comprising interconnecting at least two conductors with said material.

25. The method of claim 1 further comprising interconnecting at least six conductors with said material.

26. The method of claim 1 further comprising interconnecting a plurality of conductors with said material.

27. The method of claim 1 wherein said signal includes an analog response signal.

28. The method of claim 1 wherein said signal includes a digital response signal.

29. The method of claim 27 wherein said analog response signal is modulated.

30. The method of claim 28 wherein said digital response signal is pulse width modulated.

31. The method of claim 29 wherein modulated analog response signal includes subharmonic modulation.

32. The method of claim 31 wherein said subharmonic modulation includes a plurality of frequencies each of which may be shifted in phase.

* * * * *

UNITED STATES PATENT AND TRADEMARK OFFICE
CERTIFICATE OF CORRECTION

| | | |
|---|---|---|
| PATENT NO. | : 8,723,372 B2 | Page 1 of 1 |
| APPLICATION NO. | : 13/192060 | |
| DATED | : May 13, 2014 | |
| INVENTOR(S) | : Larry A. Park | |

It is certified that error appears in the above-identified patent and that said Letters Patent is hereby corrected as shown below:

Title Page, (56) References Cited

Delete "1,282,708 A * 10/1918 Oppenheim 110/215".

Title Page 2, (56) Other Publications, first column, line 23

Change "model for ightly doped" to read --model for lightly doped--.

Title Page 2, second column, line 5

Change "Nature, vol. 44," to read --440--.

In the Specification

Col. 3, line 54

Change "radio frequency simulations" to read --radio frequency stimulations--.

Signed and Sealed this
Ninth Day of December, 2014

Michelle K. Lee
*Deputy Director of the United States Patent and Trademark Office*